United States Patent
Skerlj et al.

(10) Patent No.: US 7,966,469 B2
(45) Date of Patent: Jun. 21, 2011

(54) MEMORY SYSTEM AND METHOD FOR OPERATING A MEMORY SYSTEM

(75) Inventors: Maurizio Skerlj, München (DE); Anthony Sanders, München (DE)

(73) Assignee: Qimonda AG, Munich (DE)

( * ) Notice: Subject to any disclaimer, the term of this patent is extended or adjusted under 35 U.S.C. 154(b) by 859 days.

(21) Appl. No.: 11/464,215

(22) Filed: Aug. 14, 2006

(65) Prior Publication Data

US 2009/0106504 A1    Apr. 23, 2009

(51) Int. Cl.
*G06F 12/00* (2006.01)
*G06F 13/00* (2006.01)
*G06F 13/28* (2006.01)

(52) U.S. Cl. .................. 711/168; 711/105; 711/157

(58) Field of Classification Search .................. 711/168, 711/105, 157
See application file for complete search history.

(56) References Cited

U.S. PATENT DOCUMENTS

| 6,356,991 B1 * | 3/2002 | Bauman et al. ............... 711/209 |
| 2001/0024389 A1 | 9/2001 | Funaba et al. |
| 2006/0179262 A1 * | 8/2006 | Brittain et al. ................ 711/169 |

FOREIGN PATENT DOCUMENTS

JP    2006155220 A    6/2006

OTHER PUBLICATIONS

"FB-DIMM Draft Specification: Architecture and Protocol", Intel, May 3, 2004 (124 pgs).*
WordNet, multiplex definition, available at http://wordnetweb.princeton.edu/perl/webwn?s=multiplex.*

* cited by examiner

*Primary Examiner* — Kevin L Ellis
*Assistant Examiner* — Ryan Bertram
(74) *Attorney, Agent, or Firm* — Dicke, Billig & Czaja, PPLC

(57) ABSTRACT

A memory system, in particular a buffered memory system, e.g., a fully buffered memory system, a method for operating a memory system, and a device for use with a memory system is disclosed. The memory system may include a first buffered memory module, and a second buffered memory module, wherein the first and the second buffered memory modules are adapted to be accessed in parallel. According to a further embodiment of the invention, a device is provided which is adapted to map consecutive accesses to the first or the second memory module to a parallel access of both the first and the second memory module.

29 Claims, 3 Drawing Sheets

MEMORY SYSTEM AND METHOD FOR OPERATING A MEMORY SYSTEM

BACKGROUND

The invention relates to a memory system, in particular a buffered memory system, e.g., a fully buffered memory system, a method for operating a memory system, and a device for use with a memory system.

In the case of conventional memory devices, in particular conventional semiconductor memory devices, one differentiates between functional memory devices (e.g., PLAs, PALs, etc.), and table memory devices, e.g., ROM devices (ROM=Read Only Memory—in particular PROMs, EPROMs, EEPROMs, flash memories, etc.), and RAM devices (RAM=Random Access Memory—in particular e.g., DRAMs and SRAMs).

A RAM device is a memory for storing data under a predetermined address and for reading out the data under this address later. In the case of SRAMs (SRAM=Static Random Access Memory), the individual memory cells consist e.g., of few, for instance 6, transistors, and in the case of DRAMs (DRAM=Dynamic Random Access Memory) in general only of one single, correspondingly controlled capacitive element.

In many applications, several DRAMs are arranged on a single, separate memory module, e.g., a separate memory card. Further, several of such memory modules—each having several DRAMs—may be connected to a respective microprocessor or memory controller via a bus system. However, the higher the number of memory modules/DRAMs connected to the microprocessor/memory controller, and the higher the data rate, the worse the quality of the signals exchanged between the memory modules/DRAMs, and the microprocessor/memory controller.

For this reason, "buffered" memory modules are used, e.g., registered DIMMs. Buffered memory modules include—in addition to several DRAMs—one or several buffer components, receiving the signals from the microprocessor/memory controller, and relaying them to the respective DRAM (and vice versa). Hence, the respective memory controller only needs to drive one capacitive load per DIMM on the bus.

To further enhance the data rate, and/or the number of memory modules which may be connected to a respective microprocessor/memory controller, FBDIMMs (Fully Buffered DIMMs) are used.

FIG. 1 illustrates a memory system 1 with FBDIMMs 2a, 2b, 2c (Fully Buffered DIMMs). In the memory system 1 illustrated in FIG. 1, up to eight memory cards/FBDIMMs 2a, 2b, 2c per channel may be connected to a microprocessor/memory controller 4. Each FBDIMM 2a, 2b, 2c includes a buffer component 5a, 5b, 5c, and several DRAMs 3a, 3b, 3c (for sake of simplicity, in FIG. 1 only one DRAM per memory card/FBDIMM 2a, 2b, 2c is illustrated). The FBDIMMs 2a, 2b, 2c may e.g., be plugged into corresponding sockets of a motherboard, which e.g., also includes the above microprocessor/memory controller 4.

As is illustrated in FIG. 1, the microprocessor/memory controller 4 may be connected to a first FBDIMM 2a of the FBDIMMs 2a, 2b, 2c via a first bus 6a, having a first channel ("South-bound channel" (SB channel)), and a second channel ("north-bound channel" (NB channel)). The SB channel of the bus 6a is used to send respective address, command, and data signals from the microprocessor/memory controller 4 to the buffer component 5a of the first FBDIMM 2a. Correspondingly similar, the NB channel of the bus 6a is used to send respective signals from the buffer component 5a of the first FBDIMM 2a to the microprocessor/memory controller 4.

As is further illustrated in FIG. 1, the first FBDIMM 2a of the FBDIMMs 2a, 2b, 2c is connected to a second FBDIMM 2b of the FBDIMMs 2a, 2b, 2c via a second bus 6b, which just as the bus 6a includes a first channel ("south-bound channel" (SB channel)), and a second channel ("north-bound channel" (NB channel)), and the second FBDIMM 2b of the FBDIMMs 2a, 2b, 2c is connected to a third FBDIMM via a third bus 6c (also having a first channel ("south-bound channel" (SB channel)), and a second channel ("north-bound channel" (NB channel)), etc., etc.

The FBDIMMs 2a, 2b, 2c work according to the "daisy chain" principle. The buffer component 5a of the first FBDIMM 2a of the FBDIMMs 2a, 2b, 2c relays the respective address, command, and data signals received via the "south-bound channel" of the first bus 6a from the microprocessor/memory controller 4—where required after a respective re-generation—via the "south-bound channel" of the second bus 6b to the buffer component 5b of the second FBDIMM 2b. Correspondingly similar, the buffer component 5b of the second FBDIMM 2b of the FBDIMMs 2a, 2b, 2c relays the respective address, command, and data signals received via the "south-bound channel" of the second bus 6b from the first FBDIMM 2a—where required after a respective re-generation—via the "south-bound channel" of the third bus 6c to the buffer component 5c of the third FBDIMM 2c, etc., etc.

Correspondingly inversely, the buffer component 5b of the second FBDIMM 2b of the FBDIMMs 2a, 2b, 2c relays the respective signals received via the "north-bound channel" of the third bus 6c from the above third FBDIMM—where required after a respective re-generation—via the "north-bound channel" of the second bus 6b to the buffer component 5a of the first FBDIMM 2a, and the buffer component 5a of the first FBDIMM 2a of the FBDIMMs 2a, 2b, 2c relays the respective signals received via the "north-bound channel" of the second bus 6b from the above second FBDIMM 2b—where required after a respective re-generation—via the "north-bound channel" of the first bus 6a to the microprocessor/memory controller 4.

As is further illustrated in FIG. 1, each DRAM 3a, 3b, 3c is connected to the corresponding buffer component 5a, 5b, 5c via a bus 7a, 7b, 7c, e.g., a respective stub-bus.

Each buffer component 5a, 5b, 5c knows its position in the above daisy chain. Which of the FBDIMMs 2a, 2b, 2c is being accessed at a certain time by the memory controller 4 may e.g., be determined in the respective buffer component 5a, 5b, 5c by comparing memory module identification data stored there (e.g., an "ID number") with identification data sent by the memory controller 4 via the above buses 6a, 6b, 6c. In conventional systems 1, only one of the FBDIMMs 2a, 2b, 2c may be accessed at a certain time, i.e., no parallel access of FBDIMMs is possible.

The buffer component 5a, 5b, 5c of an accessed FBDIMM 2a, 2b, 2c does not only relay the received address, command, and data signals via a respective south-bound channel of one of the buses 6a, 6b, 6c to the next buffer component in the daisy chain (as explained above), but also relays the signals (where appropriate, in converted form) via the above stub-bus 7a, 7b, 7c to the DRAMs 3a, 3b, 3c provided on the accessed FBDIMM 2a, 2b, 2c. Further, signals received by a respective buffer component 5a, 5b, 5c via the above stub-bus 7a, 7b, 7c from an accessed DRAM 3a, 3b, 3c are relayed (where appropriate, in converted form) via a respective north bound channel of one of the buses 6a, 6b, 6c to the previous buffer component in the daisy chain (or—by the buffer component 5a of the first the FBDIMM 2a—to the memory controller 4).

As is illustrated in FIG. 1, the stub-buses 7a, 7b, 7c on the FBDIMMs 2a, 2b, 2c, and the north bound channels of the buses 6a, 6b, 6c may e.g., comprise a data bandwidth of 144 bits per DRAM clock period, and the south bound channels of the buses 6a, 6b, 6c e.g., a data bandwidth of only 72 bits per DRAM clock period, leading to a 1:2 write to read ratio, reflecting statistics in typical memory access patterns.

However, in a system corresponding to the memory system 1 illustrated in FIG. 1, a faster memory controller 4, faster buses 6a, 6b, 6c and 7a, 7b, 7c, and faster buffer components 5a, 5b, 5c still might not lead to an increased overall performance.

For these or other reasons, there is a need for the present invention.

SUMMARY

The present invention provides a memory system. According to one embodiment of the invention, the memory system includes a first buffered memory module, and a second buffered memory module, wherein the first and the second buffered memory modules are adapted to be accessed in parallel. According to another embodiment of the invention, a device is provided which is adapted to map consecutive accesses to a first or a second buffered memory module to a parallel access of both the first and the second memory module.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
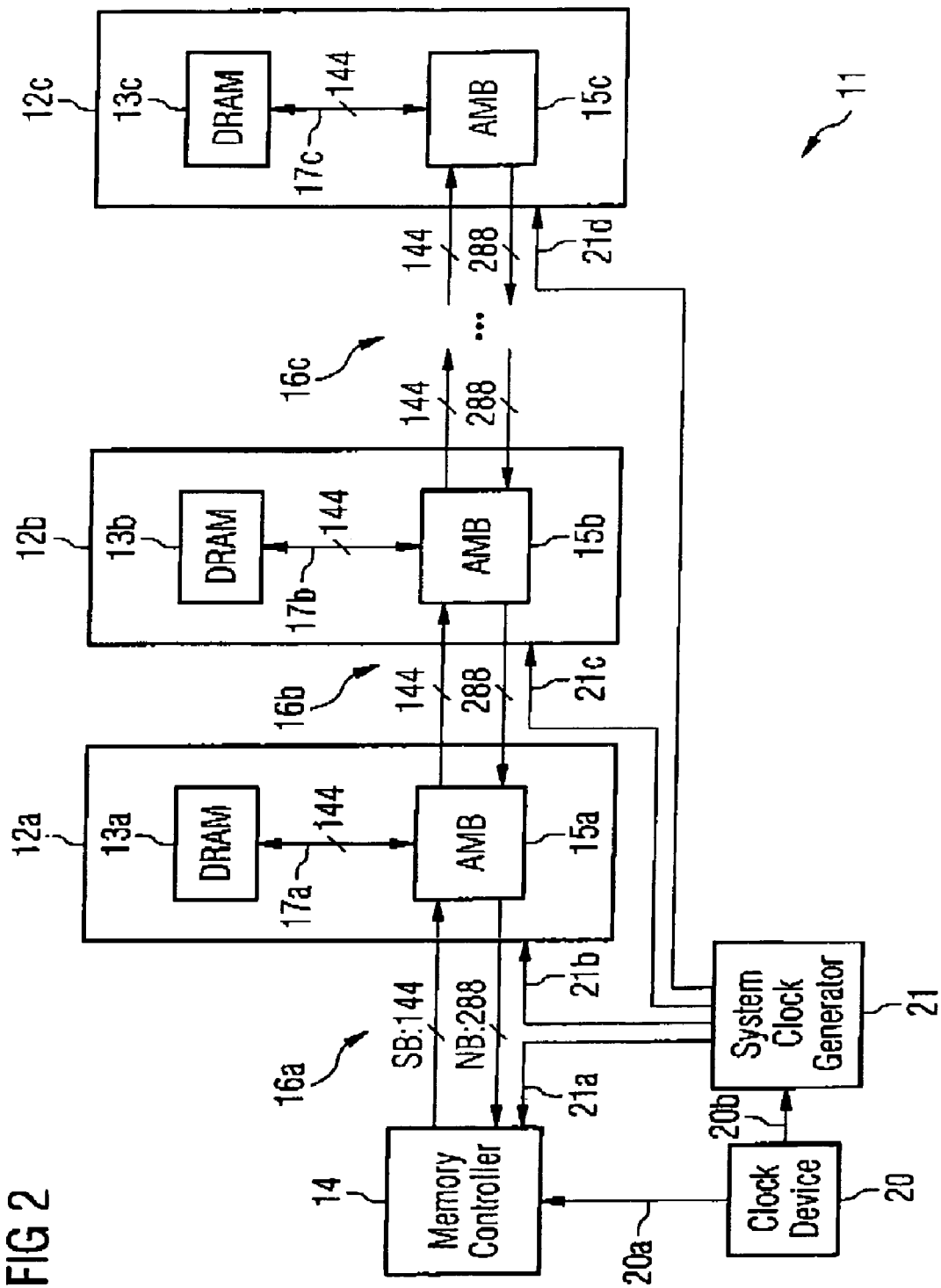
FIG. 2 illustrates a memory system with buffered memory modules according to an embodiment of the present invention.

FIG. 2 illustrates a memory system 11 with buffered memory modules 12a, 12b, 12c according to an embodiment of the present invention.

As is illustrated in FIG. 2, several, e.g., more than three, seven, or fifteen, e.g., up to eight memory modules 12a, 12b, 12c, e.g., respective memory cards/FBDIMMs (Fully Buffered DIMMs) 12a, 12b, 12c per channel may be connected to a memory controller 14. The memory controller 14 in turn may be connected via one or several buses to one or several microprocessors (not shown). For sake of simplicity, FIG. 2 only depicts one single channel. The system 11 may comprise more than the one channel illustrated in FIG. 2, e.g., more than two or four channels, each having—just as the channel illustrated in FIG. 2—several, e.g., more than three, seven, or fifteen, e.g., up to eight memory modules/FBDIMMs (Fully Buffered DIMMs).

Each FBDIMM 12a, 12b, 12c includes one or several buffer components 15a, 15b, 15c, and one or several RAM devices 13a, 13b, 13c, in particular e.g., DRAMs or SRAMs, here: SDRAMs, e.g., more than three, seven, or fifteen, for instance eight DRAMs (for sake of simplicity, in FIG. 2 only one DRAM per memory card/FBDIMM 12a, 12b, 12c is illustrated).

Each DRAM may e.g., have a storage capacity of e.g., 128 MBit, 256 MBit, 512 MBit, 1 GBit, 2 Gbit, etc. (or more); the total storage capacity provided by a corresponding FBDIMM 12a, 12b, 12c depends on the number of DRAMs provided on a FBDIMM, and on the storage capacity of the individual DRAMs, and is, for instance, 1 GByte, 2 GByte, etc. (or more).

The FBDIMMs 12a, 12b, 12c may e.g., be plugged into corresponding sockets of a motherboard, which e.g., may also include the above memory controller 14, and/or the above microprocessor(s).

Figure 1:
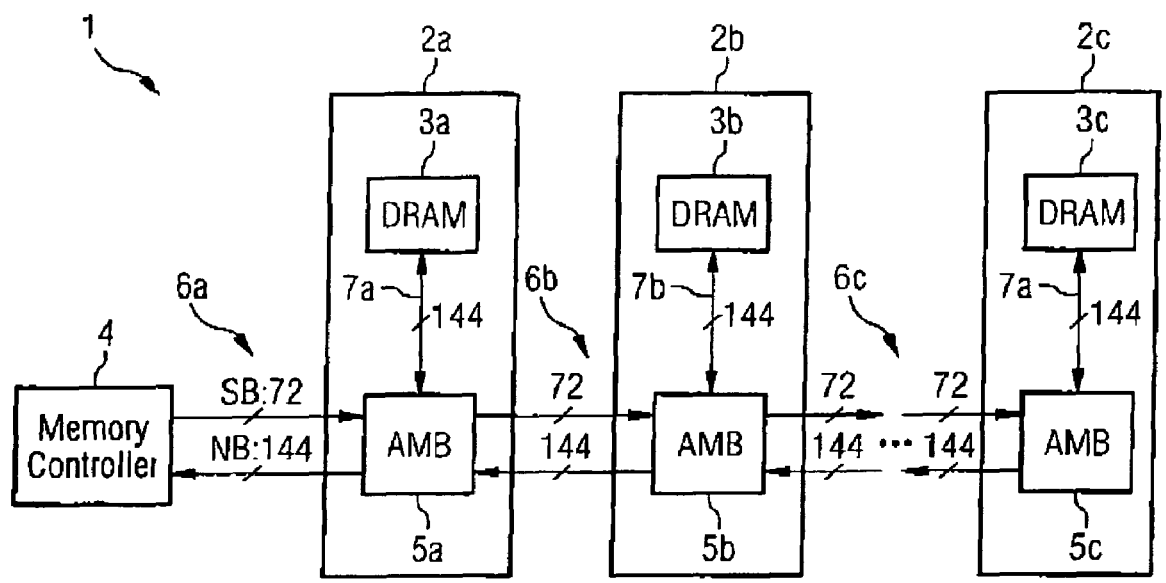
FIG. 1 illustrates a conventional memory system with buffered memory modules.
Figure 3:
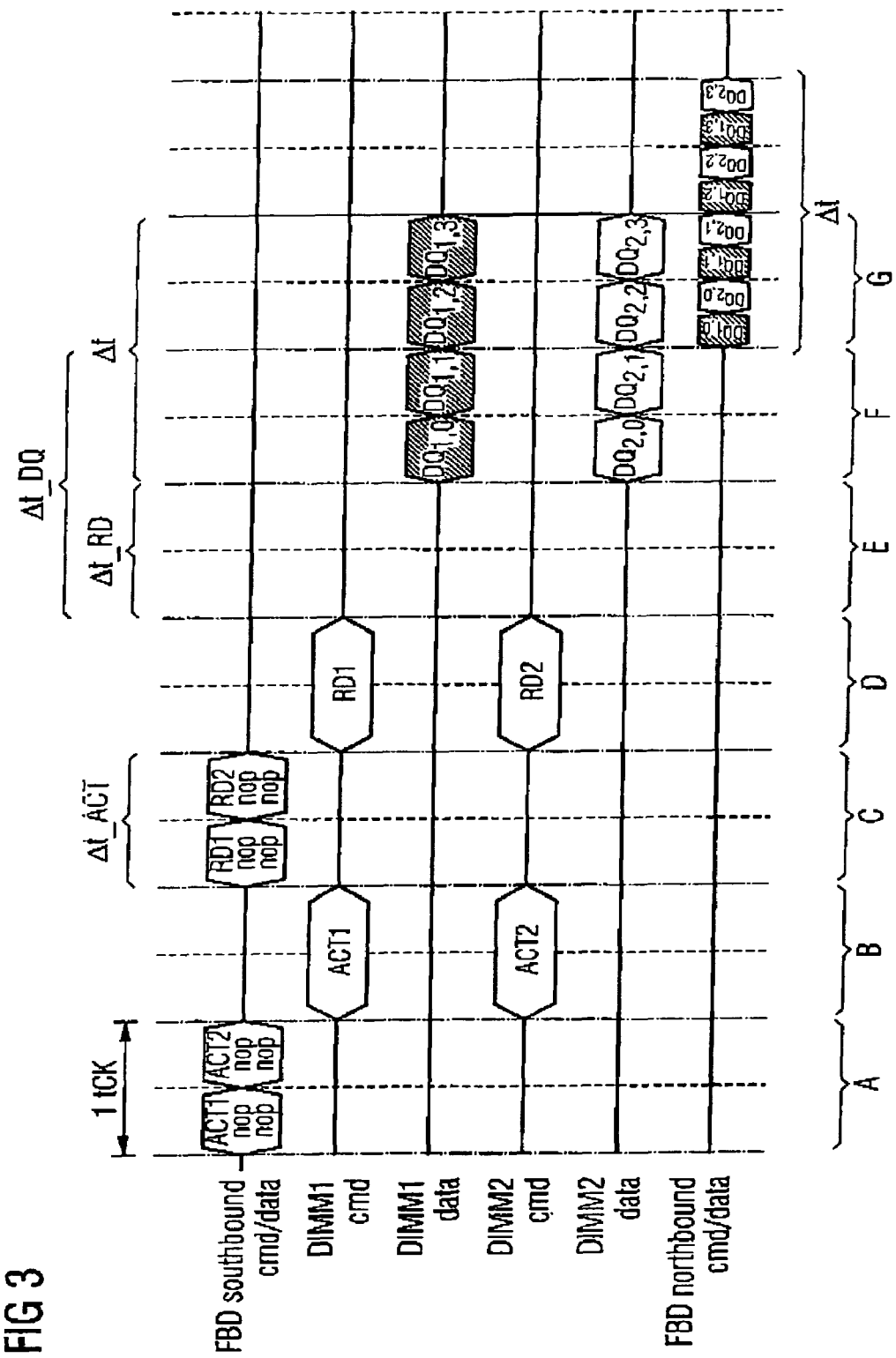
FIG. 3 illustrates a timing diagram of signals which might be used in the memory system illustrated in FIG. 2.

As is illustrated in FIG. 3, and as will be described in further detail below, and other than in conventional memory systems such as e.g., illustrated in FIG. 1, with the memory system 11 illustrated in FIG. 2, several of the FBDIMMs 12a, 12b, 12c—e.g., two or more of the FBDIMMs 12a, 12b, 12c of one single channel—may be accessed by the above memory controller 14/microprocessor(s) at one and the same time—in other words, a parallel (read and/or write) access of FBDIMMs 12a, 12b, 12c is possible.

In particular, for example, at one and the same time/in parallel, a "read" access might be carried out on two or more of the FBDIMMs 12a, 12b, 12c.

Correspondingly similar, for example, a "write" access might be carried out on two or more of the FBDIMMs 12a, 12b, 12c at one and the same time/in parallel.

As is illustrated in FIG. 2, the memory controller 14 may be connected to a first FBDIMM 12a ("DIMM 1") of the FBDIMMs 12a, 12b, 12c via a first bus 16a provided on the above motherboard, having a first channel ("south-bound channel" (SB channel)), and a second channel ("north-bound channel" (NB channel)). The SB channel of the bus 16a is used to send respective address, command, and data signals from the memory controller 14 (and/or the above microprocessor(s)) to the buffer component 15a of the first FBDIMM 12a. Correspondingly similar, the NB channel of the bus 16a is used to send respective signals from the buffer component 15a of the first FBDIMM 12a to the memory controller 14 (and/or the above microprocessor(s)).

As is further illustrated in FIG. 2, the first FBDIMM 12a of the FBDIMMs 12a, 12b, 12c is connected to a second FBDIMM 12b ("DIMM 2") of the FBDIMMs 12a, 12b, 12c via a second bus 16b, which just as the bus 16a includes a first channel ("south-bound channel" (SB channel)), and a second channel ("north-bound channel" (NB channel)), and the second FBDIMM 12b of the FBDIMMs 12a, 12b, 12c is connected to a third FBDIMM via a third bus 16c (also having a first channel ("south-bound channel" (SB channel)), and a second channel ("north-bound channel" (NB channel)), etc., etc.

According to FIG. 2, the memory system 11 in addition to the above FBDIMMs 12a, 12b, 12c, and the memory controller 14 includes a clock device 20, and a system clock generator 21. The clock device 20 generates a central clock signal, which is provided via respective lines 20a, 20b to the memory controller 14, and the system clock generator 21. The system clock generator 14—from the central clock signal generated by the clock generator 20—generates respective individual clock signals for the memory controller 14, and each of the FBDIMMs 12a, 12b, 12c (which are provided via respective individual lines 21a, 21b, 21c, 21d from the system clock generator 21 to the memory controller 14, the first FBDIMM 12a, the second FBDIMM 12b, etc.). The timing of the clock signals provided by the system clock generator 21 on the above lines 21a, 21b, 21c, 21d might be such that respective positive/negative flanks of the clock signals might occur at identical points of time, or might be slightly offset from one another, still defining—as is illustrated in FIG. 3—for the whole memory system 11, i.e., each of the FBDIMMs 12a, 12b, 12c, as well as the memory controller 14 a unique common timing scheme (defining subsequent unique common clock periods A, B, C, D, E, F, G, etc., etc. for each of the FBDIMMs 12, 12b, 12c, as well as the memory controller 14, i.e., the whole system 11, each of the clock periods A, B, C, D, E, F, G, etc., etc. lasting a corresponding clock cycle time 1 tCK). Many other ways of generating/providing respective clock signals and/or a unique common timing scheme are also possible. For instance, the memory controller 14 might generate a clock signal, which is provided to the first FBDIMM 12a, from where the clock signal—where required after a respective re-generation—is provided to the second FBDIMM 12b, and from the second FBDIMM 12b to the third FBDIMM, etc., etc.

The FBDIMMs 12a, 12b, 12c work according to the "daisy chain" principle. The buffer component 15a of the first FBDIMM 12a of the FBDIMMs 12a, 12b, 12c relays the respective address, command, and data signals received via the "south-bound channel" of the first bus 16a from the microprocessor/memory controller 14—where required after a respective re-generation—via the "south-bound channel" of the second bus 16b to the buffer component 15b of the second FBDIMM 12b. Correspondingly similar, the buffer component 15b of the second FBDIMM 12b of the FBDIMMs 12a, 12b, 12c relays the respective address, command, and data signals received via the "south-bound channel" of the second bus 16b from the first FBDIMM 12a—where required after a respective regeneration—via the "south-bound channel" of the third bus 16c to the buffer component 15c of the third FBDIMM 12c, etc., etc.

Correspondingly inversely, the buffer component 15b of the second FBDIMM 12b of the FBDIMMs 12a, 12b, 12c relays the respective signals received via the "north-bound channel" of the third bus 16c from the above third FBDIMM—where required after a respective re-generation—via the "north-bound channel" of the second bus 16b to the buffer component 15a of the first FBDIMM 12a, and the buffer component 15a of the first FBDIMM 12a of the FBDIMMs 12a, 12b, 12c relays the respective signals received via the "north-bound channel" of the second bus 16b from the above second FBDIMM 12b—where required after a respective re-generation—via the "north-bound channel" of the first bus 16a to the microprocessor/memory controller 14.

As will be described in further detail below, the memory controller 14, and each of the buffer components 15a, 15b, 15c send out the above signals (data, and/or address, and/or command signals) on the respective "south-bound" and "north bound" channels of the above buses 16a, 16b, and 16c with respect to the timing provided by the above unique common timing scheme of the memory system 11 as defined by the above clock signals provided by the system clock generator 21 on the above lines 21a, 21b, 21c, 21d (i.e., with respect to the unique common clock periods A, B, C, D, E, F, G, etc., defined by the clock signals, and as illustrated in FIG. 3).

As is further illustrated in FIG. 2, and correspondingly similar as is the case in conventional memory systems, each of the RAM devices, in particular e.g., DRAMs or SRAMs, here: SDRAMs 13a, 13b, 13c provided on the above FBDIMMs 12a, 12b, 12c is connected to the corresponding buffer component(s) 15a, 15b, 15c provided on a respective FBDIMM 12a, 12b, 12c via a bus 17a, 17b, 17c, e.g., a respective stub-bus.

According to FIG. 2, the stub-buses 17a, 17b, 17c on the FBDIMMs 12a, 12b, 12c, and the south bound channels of the buses 16a, 16b, 16c may e.g., include the same data bandwidth, e.g., a data bandwidth of 144 bits per DRAM clock period. Further, the north bound channels of the buses 16a, 16b, 16c might e.g., include a higher data bandwidth as the south bound channels, and the stub-buses 17a, 17b, 17c on the FBDIMMs 12a, 12b, 12c, e.g., two times the data bandwidth of the south bound channels and the stub-buses 17a, 17b, 17c, e.g., a data bandwidth of 288 bits per DRAM clock period.

Each buffer component 15a, 15b, 15c of the FBDIMMs 12a, 12b, 12c knows its position in the above daisy chain. Which of the FBDIMMs 12a, 12b, 12c is being accessed at a certain time by the memory controller 14 may e.g., be determined in the respective buffer component 15a, 15b, 15c by comparing memory module identification data stored there (e.g., an "ID number") with identification data sent by the memory controller 14 via the above buses 16a, 16b, 16c, e.g., via one or several separate address and/or command lines of the above buses 16a, 16b, 16c.

As the above, with the memory system 11 illustrated in FIG. 2, several of the FBDIMMs 12a, 12b, 12c—e.g., two or more of the FBDIMMs 12a, 12b, 12c of one single channel—may be accessed by the above memory controller 14/microprocessor(s) at one and the same time—in other words, a parallel (read and/or write) access of FBDIMMs 12a, 12b, 12c is possible.

For example, as is illustrated in FIG. 3, to carry out two or more parallel "read" accesses on two or more of the FBDIMMs 12a, 12b, 12c in parallel, the two or more FBDIMMs 12a, 12b, 12c to be accessed in parallel (e.g., the first FBDIMM 12a ("DIMM 1"), and the second FBDIMM 12b ("DIMM 2")) are activated at the same time by respective "Activate" Commands ACT1, ACT2 being sent out by the memory controller 14 on the above south bound channels of the buses 16a, 16b, 16c in parallel (i.e., on one and the same common clock period of the above clock periods A, B, C, D, E, F, G (here: e.g., the clock period B)).

Together with the above "Activate" Commands ACT1, ACT2—e.g., also at the above clock period B—, "ID numbers" identifying the FBDIMMs 12a, 12b, 12c to be accessed in parallel may be sent out by the memory controller 14 on the above south bound channels of the buses 16a, 16b, 16c (here e.g., a first ID number to identify the first FBDIMM 12a ("DIMM 1"), and a second ID number to identify the second FBDIMM 12b ("DIMM 2") to be accessed in parallel to the first FBDIMM 12a).

As the above, the buffer components 15a, 15b, 15c of the FBDIMMs 12a, 12b, 12c determine whether or not they are accessed at a certain time by comparing the ID number stored there with the ID number sent out by the memory controller 14.

After a certain buffer component 15a, 15b, 15c (here: the buffer component 15a of the first FBDIMM 12a, and the buffer component 15b of the second FBDIMM 12b) has determined that the corresponding FBDIMM 12a, 12b, 12c is to be accessed, the corresponding buffer component (here: e.g., the buffer component 15a of the first FBDIMM 12a, and the buffer component 15b of the second FBDIMM 12b) does not only relay the address, command, and data signals received via a respective south-bound channel of one of the buses 16a, 16b, 16c to the next buffer component in the daisy chain (as explained above), but also relays the signals (where appropriate, in converted form) via the above stub-buses (here: the stub-bus 17a of the first FBDIMM 12a, and the stub-bus 17b of the second FBDIMM 12b) to the RAMs (here: the RAMs 13a, 13b) provided on the accessed FBDIMMs (here: the FBDIMMs 12a, 12b)).

As is further illustrated in FIG. 3, a predetermined time $\Delta t\_ACT$ after the above "Activate" Commands ACT1, ACT2, respective "read" commands RD1, RD2 are sent out by the memory controller 14 on the above south bound channels of the buses 16a, 16b, 16c in parallel (i.e., on one and the same common clock period of the above clock periods A, B, C, D, E, F, G (here: e.g., the clock period D, i.e., one clock cycle time 1 tCK after the "Activate" Commands ACT1, ACT2)).

Together with and/or after the above "read" Commands RD1, RD2 respective row and/or column addresses may be sent out by the memory controller 14 on the above south bound channels of the buses 16a, 16b, 16c (here e.g., a first row and/or column address for the first FBDIMM 12a ("DIMM 1"), and a second row and/or column address for the second FBDIMM 12b ("DIMM 2")). The addresses for the first and second FBDIMM 12a, 12b may e.g., be sent out one after the other, i.e., on different clock periods, or preferably at the same or corresponding clock periods (e.g., the row addresses for the first and second FBDIMMs 12a, 12b at a first clock period, and the column addresses for the first and second FBDIMMs 12a, 12b at a second, subsequent clock period).

In response to the "read" Commands RD1, RD2, and the above row and/or column addresses the buffer components 15a, 15b of the accessed FBDIMMs 12a, 12b—correspondingly similar as in conventional memory systems—by sending out respective command and address signals on the above stub-buses 17a, 17b carry out a respective "READ" access on a respective RAM (here: the RAM 13a, and the RAM 13b) of the FBDIMMs 12a, 12b. In response, the data is read out from the RAMs 13a, 13b (here: the data $DQ_{1,0}$, $DQ_{1,1}$, $DQ_{1,2}$, $DQ_{1,3}$ from the RAM 13a, and the data $DQ_{2,0}$, $DQ_{2,1}$, $DQ_{2,2}$, $DQ_{2,3}$ from the RAM 13b), and is sent from the RAMs 13a, 13b via the respective stub-bus 17a, 17b to the respective buffer component (here: the buffer components 15a, 15b). As can be seen in FIG. 3, the reading out of the data on both the FBDIMM 12a and the FBDIMM 12b may be performed in parallel a predetermined time $\Delta t\_RD$ after the above "read" Commands RD1, RD1 are sent out by the memory controller 14 (i.e., starting on one and the same common clock period of the above common clock periods A, B, C, D, E, F, G (here: e.g., the clock period F, i.e., one clock cycle time 1 tCK after the "read" Commands RD1, RD2)). As can be further seen in FIG. 3, the reading out of the data (here: the data $DQ_{1,0}$, $DQ_{1,1}$, $DQ_{1,2}$, $DQ_{1,3}$, and the data $DQ_{2,0}$, $DQ_{2,1}$, $DQ_{2,2}$, $DQ_{2,3}$) may occur in a time-multiplexed fashion, lasting several cycle times 1 tCK (here: two cycle times 1 tCK, i.e., a time period $\Delta T$).

After reading out the respective data (here: e.g., the above data $DQ_{2,0}$, $DQ_{2,1}$, $DQ_{2,2}$, $DQ_{2,3}$) from the respective RAM (here: the RAM 13b), the buffer component 15b of the second FBDIMM 12b sends the data via the north-bound channel of the bus 16b to the previous buffer component in the daisy chain (here: the buffer component 15a of the first FBDIMM 12a). Further, also after reading out the respective data (here: e.g., the above data $DQ_{1,0}$, $DQ_{1,1}$, $DQ_{1,2}$, $DQ_{1,3}$) from the respective RAM (here: the RAM 13a)—and after receiving the data (here: e.g., the above data $DQ_{2,0}$, $DQ_{2,1}$, $DQ_{2,2}$, $DQ_{2,3}$) from the buffer component 15b of the second FBDIMM 12b—the buffer component 15a of the first FBDIMM 12a, being the first buffer component in the daisy chain sends the data received from the buffer component 15b, and the RAM 13a (i.e., the data $DQ_{1,0}$, $DQ_{1,1}$, $DQ_{1,2}$, $DQ_{1,3}$, and the data $DQ_{2,0}$, $DQ_{2,1}$, $DQ_{2,2}$, $DQ_{2,3}$) in a time-multiplexed fashion via the north-bound channel of the bus 16a to the memory controller 14. As can be seen in FIG. 3, the sending out of the data (i.e., the data $DQ_{1,0}$, $DQ_{1,1}$, $DQ_{1,2}$, $DQ_{1,3}$, and/or $DQ_{2,0}$, $DQ_{2,1}$, $DQ_{2,2}$, $DQ_{2,3}$) on the buses 16a, 16b may be performed in parallel a predetermined, fixed time $\Delta t\_DQ$ after the above "read" Commands RD1, RD1 are sent out by the memory controller 14 (i.e., starting on one and the same common clock period of the above common clock periods A, B, C, D, E, F, G (here: e.g., the clock period G, i.e., two clock cycle times 1 tCK after the "read" Commands RD1, RD2)). As can be further seen in FIG. 3, the sending out of the data (here: the data $DQ_{1,0}$, $DQ_{1,1}$, $DQ_{1,2}$, $DQ_{1,3}$, and the data $DQ_{2,0}$, $DQ_{2,1}$, $DQ_{2,2}$, $DQ_{2,3}$) on the buses 16a, 16b may last several cycle times (here: two cycle times 1 tCK, i.e., a time period $\Delta T$), whereby the number of cycle times/the time period $\Delta T$ during which the data (here: the data $DQ_{1,0}$, $DQ_{1,1}$, $DQ_{1,2}$, $DQ_{1,3}$, and the data $DQ_{2,0}$, $DQ_{2,1}$, $DQ_{2,2}$, $DQ_{2,3}$) is sent out on the buses 16a, 16b corresponds to the above number of cycle times/the above time period $\Delta T$ during which the data is read out by the buffer components 15a, 15b from the RAMs 13a, 13b.

Typical memory access patterns of typical programs executed on the above processor(s) connected with the memory controller 14 frequently lead to a consecutive access of adjacent or nearby memory locations (e.g., memory cells belonging to one single row of memory cells of one single RAM located on one single FBDIMM).

In one embodiment of the invention, the memory controller 14 may map such consecutive accesses to adjacent or nearby memory locations of one single RAM located on one single FBDIMM (or more generally: consecutive accesses to one single FBDIMM) to accesses of different RAMs located on different FBDIMMs.

In one embodiment, consecutive read (and/or write) accesses to adjacent or nearby memory locations of one single RAM located on one single FBDIMM (or consecutive read (and/or write) accesses to one single FBDIMM) may be mapped by the memory controller 14 into the above parallel (read and/or write) accesses to two or more different FBDIMMs 12a, 12b, 12c described above (e.g., in connection with FIG. 3).

For this purpose, appropriate physical address mapping and/or scheduling techniques may be used by the memory controller 14.

For example, if the processor(s) issues consecutive read (and/or write) accesses to adjacent or nearby memory locations of one single RAM located on one single FBDIMM (or consecutive read (and/or write) accesses to one single FBDIMM), parts of the respective row and/or column address used by the processor(s) to specify a respective memory cell on one single RAM (or parts of any other address used to specify a memory cell on one single FBDIMM) may be used by the memory controller 14 as the above "ID number" (or part of the above ID number) instead, sent out by the memory controller 14 on the above south bound channels of the buses 16a, 16b, 16c to identify the respective FBDIMM or FBDIMMs 12a, 12b, 12c to be accessed. In one embodiment, the least significant bit or bits of the above address, e.g., row and/or column address may be used for this purpose (e.g., the one, two, or three least significant bits of the address).

Thereby it is ensured that consecutive read (and/or write) accesses to adjacent or nearby memory locations of one single RAM or one single FBDIMM are mapped by the memory controller 14 into accesses to different FBDIMMs (which as the above preferably are carried out in parallel).

Alternatively or additionally, a scheduling technique may be employed in the memory controller which avoids consecutive accesses to one single FBDIMM.

Hence, if according to the commands issued by the processor(s) consecutive read (and/or write) accesses to adjacent or non-adjacent memory locations of one single RAM or one single FBDIMM are to be performed, a re-scheduling is performed by the memory controller 14. For instance, even if according to the commands issued by the processor(s) e.g., first an access to a first FBDIMM 12a is to be performed, then again an access to the first FBDIMM 12a (referring to the same, i.e. a first, or a different RAM (or to adjacent, or non-adjacent memory locations)), and afterwards an access to a second FBDIMM 12b, and then again an access to the second FBDIMM 12b (referring to the same, i.e. a first, or a different RAM (or to adjacent, or non-adjacent memory locations)), the memory controller 14 performs a re-scheduling such that e.g., first a first parallel access to both the first and the second FBDIMM 12a and 12b is performed (e.g., to the above first RAMs), and thereafter a second parallel access again to both the first and the second FBDIMM 12a and 12b (e.g., again to the above first, or to the above different RAMs). For this purpose the memory controller 14 in a first process determines whether or not consecutive accesses refer to one single FBDIMM, and—if it is determined that consecutive accesses refer to one single FBDIMM—in a second process performs a respective re-scheduling to avoid consecutive accesses to one single FBIMM, e.g., by performing the above parallel access to different FBDIMMs, instead.

The above parallel (read and/or write) access in a further variant of the invention may also be used to mimic RAM burst accesses with higher I/O speed and longer burst length than provided for by the RAMs 13a, 13b, 13c on the FBDIMMs 12a, 12b, 12c.

A burst read or write access of the processor(s) to one single RAM of one single FBDIMM and referring to a first burst length may be mapped by the memory controller into the above parallel read or write access to two different RAMs on two different FBDIMMs described above (e.g., in connection with FIG. 3) with a second, different burst length (e.g., half the burst length as specified by the processor(s)).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory system, comprising:
   a south bound channel having a first data bandwidth;
   a north bound channel having a second data bandwidth two times the first data bandwidth;
   a first buffered memory coupled to the south bound channel and the north bound channel, the first buffered memory configured for reading first data out of the first buffered memory within a first time period having a first length; and
   a second buffered memory coupled to the south bound channel and the north bound channel, the second buffered memory configured for reading second data out of the second buffered memory within the first time period, wherein the first and the second buffered memories are configured to be read in parallel, and
   wherein the first data and the second data are transmitted in a time-multiplexed fashion via the north bound channel within a second time period having the first length.

2. The memory system of claim 1, wherein the first and the second memories each comprise at least one RAM.

3. The memory system of claim 2, wherein the first and the second memories each comprise at least one DRAM.

4. The memory system of claim 1, wherein the first and the second memories each comprise at least one buffer component.

5. The memory system of claim 1, wherein the memory system is adapted to comprise a variably adjustable number of memories.

6. The memory system of claim 1, wherein the first buffered memory and the second buffered memory are configured to be accessed in parallel with respect to a common timing scheme.

7. A device for use with a memory system as defined by claim 1, the device being adapted to map consecutive accesses to the first or the second memory to a parallel access of both the first and the second memories.

8. The device of claim 7, wherein the device is a memory controller.

9. The memory system of claim 1, wherein the first and second buffered memory are arranged on separate integrated circuits.

10. A memory system, comprising:
    a first buffered memory module;
    a second buffered memory module, wherein the first and the second buffered memory modules are adapted to be read in parallel; and
    a memory controller connected with the first memory module via a first bus,
    wherein the memory controller is configured to, in response to simultaneous read commands to the first buffered memory module and the second buffered memory module, receive data read within a first time period having a first length from the first buffered memory module and data read within the first time period from the second buffered memory module over the first bus in a multiplexed fashion within a second time period having the first length such that the data read from the first buffered memory module is interlaced with the data read from the second buffered memory module.

11. The memory system of claim 10, wherein the first memory module is connected with the second memory module via a second bus.

12. The memory system of claim 11, wherein the first and the second memory module each comprise at least one DRAM, the DRAM of the first memory module being connected with a buffer component of the first memory module via a third bus, and the DRAM of the second memory module being connected with a buffer component of the second memory module via a fourth bus.

13. The memory system of claim 10, comprising a processor, the memory controller being adapted to map consecutive accesses of the processor to the first or the second memory module to a parallel access of both the first and the second memory module.

14. The memory system of claim 10, wherein the first bus comprises:
a south bound channel having a first data bandwidth; and
a north bound channel having a second data bandwidth two times the first data bandwidth.

15. A method for operating a memory system, comprising:
providing a first buffered memory and a second buffered memory, the first buffered memory configured for reading first data out of the first buffered memory within a first time period having a first length in response to a read command, and the second buffered memory configured for reading second data out of the second buffered memory within the first time period in response to a read command; and
reading the first and the second buffered memories in parallel by:
simultaneously sending an activate command to both the first and the second buffered memories at a same first clock period;
simultaneously sending a read command to both the first and the second buffered memories at a same second clock period after the first clock period; and
transmitting the first data from the first buffered memory and the second data from the second buffered memory in a time-multiplexed fashion within a second time period having the first length.

16. The method of claim 15, further comprising:
writing the first and the second buffered memories in parallel, the writing comprising sending a write command to both the first and the second buffered memories at a same clock period.

17. The method of claim 15, wherein transmitting the first data and the second data comprises transmitting the first data and the second data from the first and the second buffered memories at a third clock period a predetermined time after the second clock period.

18. The method of claim 15, comprising:
mapping consecutive accesses to the first or the second memory to a parallel access of both the first and the second memories.

19. The method of claim 15, comprising:
mapping a burst access to the first or the second memory with a first burst length to parallel burst accesses of both the first and the second memories with a second, different burst length.

20. A memory system, comprising:
means for providing a first buffered memory module;
means for providing a second buffered memory module, wherein the first and the second buffered memory means are adapted to be read in parallel; and
means for, in response to simultaneous read commands to both the first and the second buffered memory means, receiving data read within a first time period having a first length from the first buffered memory means and data read within the first time period from the second buffered memory means in a multiplexed fashion within a second time period having the first length such that the data read from the first buffered memory means is interlaced with the data read from the second buffered memory means.

21. A system comprising:
a memory controller;
a plurality of memory devices, including a first and a second memory device, each memory device including a memory and a buffer, wherein the plurality of memory devices are consecutively coupled in a daisy-chain fashion to a channel of the memory controller, the first memory device configured for reading first data out of the first memory device within a first time period having a first length, and the second memory device configured for reading out second data from the second memory device within the first time period; and
a clock generator configured to provide a clock signal to the memory controller and to each memory device;
wherein the memory controller is configured to provide separate memory read operation commands to the first and second memory devices simultaneously in a first period of the clock signal such that the first and second memory devices perform a memory read operation in parallel with one another beginning at a second period of the clock signal which is a predetermined time after the first period, and
wherein the first and second memory devices are configured to transmit the first data and the second data in a time-multiplexed fashion to the memory controller within a second time period having the first length in response to the separate memory read operations of the first and second memory devices.

22. The system of claim 21, wherein the separate memory read operation commands comprise read commands such that in response to corresponding read command, the memories of the first and second memory devices are configured to provide the first and second data stored therein to a corresponding memory module, and wherein upon receipt of the first and second data the memory modules of the first and second memory are configured to transmit the first and second data in the time-multiplexed fashion to the memory controller beginning at a third clock period which is a predetermined time after the second period.

23. The system of claim 21, wherein the memory controller is configured to provide separate memory access write operation commands to the first and second memory devices in a third period of the clock signal such that the first and second memory devices perform a memory access write operation in parallel with one another beginning at a fourth period of the clock signal which is a predetermined time after the third period.

24. The system of claim 21, wherein each memory device is arranged on a separate integrated circuit.

25. The system of claim 21, wherein each memory device comprises a memory module.

26. The system of claim 21, wherein the memory of each memory device comprises at least one RAM.

27. The system of claim 21, wherein the memory of each memory device comprises at least one DRAM.

28. The system of claim 21, wherein the separate memory read operation commands include separate activate commands to the first and second memory devices.

29. The system of claim 21, further comprising:
a south bound channel of the memory controller having a first data bandwidth; and
a north bound channel of the memory controller having a second data bandwidth two times the first data bandwidth.

* * * * *